Jan. 31, 1961
H. C. WHITE, JR
2,969,996
HANDLE CONNECTOR
Filed Jan. 7, 1959
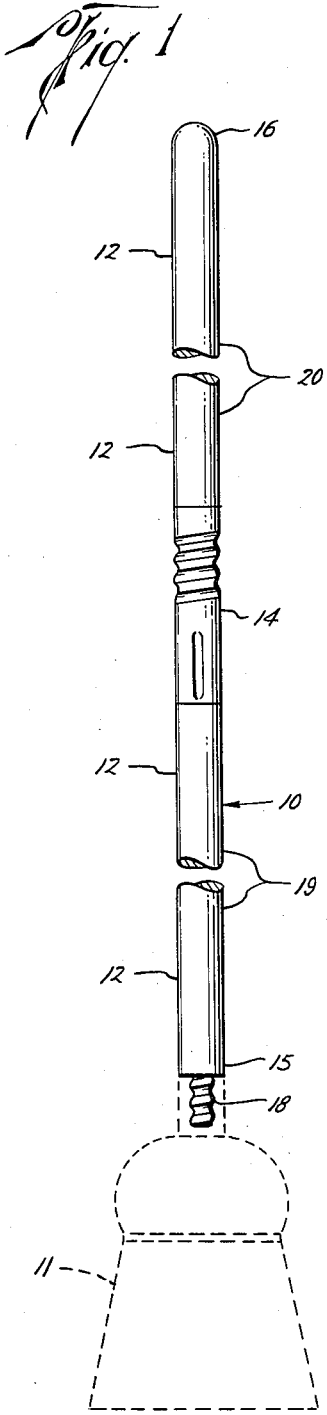
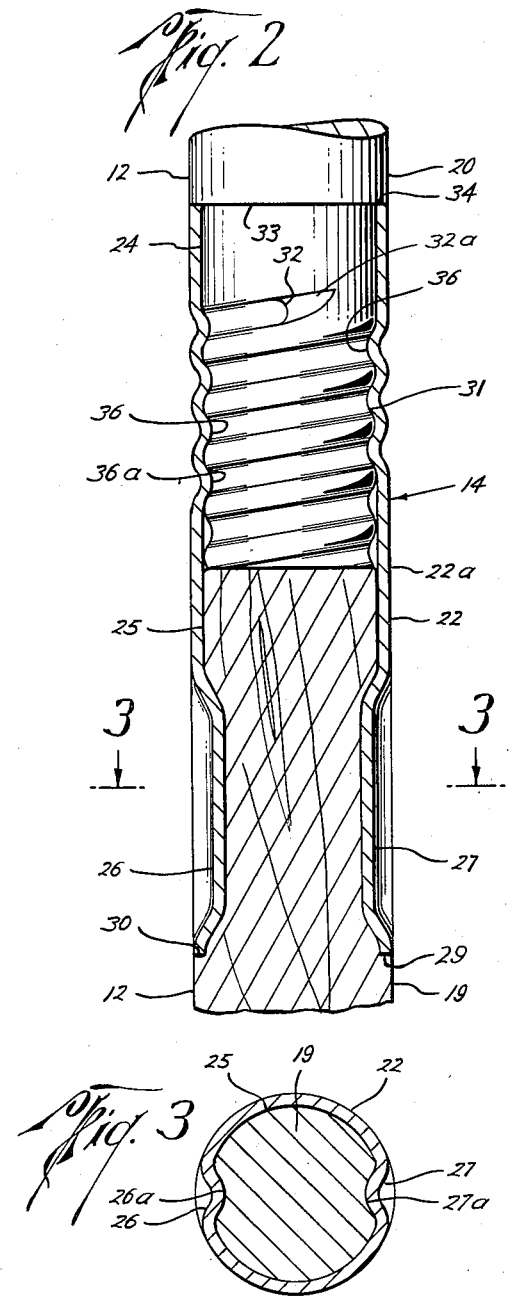
Herbert C. White, Jr.
INVENTOR.
BY Carl B. Fox, Jr.
ATTORNEY

United States Patent Office 2,969,996
Patented Jan. 31, 1961

2,969,996

HANDLE CONNECTOR

Herbert C. White, Jr., Lufkin, Tex., assignor of fifty percent to Temple-White Company, Inc., Diboll, Tex., a corporation of Texas Filed Jan. 7, 1959, Ser. No. 785,456

3 Claims. (Cl. 287—117)

This invention relates to improved connections for joints of sectional handles, poles, shafts, and the like. The connections are particularly useful in the case of elongate cylindrical wood sections to be joined, but are adaptable to joinder of such sections made of other materials, either like or unlike in composition.

A principal object of the invention is to provide such connections or joints which are rigid and strong.

Another object of the invention is to provide joints or connections for generally cylindrical members which are to be joined axially aligned, said joints or connections being readily dismantled or disconnected.

A further object of the invention is to provide a jointed member having such connection between its elements, whereby the member and/or goods of which it is a component may be sold dismantled and may be readily and easily assembled for use.

Another object of the invention is to provide such apparatus which is safe in either assembled or dismantled condition, having no sharp or otherwise dangerous parts exposed by means of which a person might be injured.

Another object of the invention is to provide such apparatus and connections which are outwardly smooth and are pleasing in appearance, and yet are strong and durable in use.

The invention provides a connector for sectional handles, poles, shafts, and the like which efficiently and effectively joins the sections in such a manner that the assembled apparatus is equal to or superior to a single element in use, and yet may be more readily carried and stored. The joints or connections include a sleeve which is disposed over the ends of adjacent elongate cylindrical members to be joined, the member ends usually being reduced in diameter so that the assembly has no protruding parts and the exterior of the sleeve is flush with the member exteriors. The sleeve is permanently affixed to one of the members, and the other of the members is screwed into the sleeve to complete the joint therebetween. The sleeve and members are designed such that the joint may be tightened by a non-muscular person, e.g., a housewife, and yet may be easily dismantled by such person. When the joint is assembled, the connected members are rigidly united.

Other objects and advantages of the invention will appear from the following description of a preferred embodiment thereof, reference being made to the accompanying drawings, of which:

Figure 1 is a broken side elevation of the preferred embodiment of the invention incorporated into the handle portion of an ordinary broom in upright position;

Figure 2 is a vertical section taken along the axis of the handle shown in Figure 1, Figure 2 showing only the handle portions adjacent the joint or connection thereof; and Figure 3 is a horizontal section taken at line 3—3 of Figure 2.

Referring to the drawings in detail, the broom 10 includes the usual broom straw brush end 11 of any suitable form and a wood handle 12 extending therefrom. The brush end 11 is shown only for purposes of illustration, since the invention is concerned only with the handle 12 and the joint or connection 14 thereof, and handle 12 may be connected at either terminal end 15 or 16 to any desired device or to nothing at all.

As illustrated in Figure 1, handle 12 is shown as having a threaded end 18 of reduced diameter, such threads being suitable for connection of brush end 11 to the handle but in no way limiting the invention. Handle 12 as illustrated comprises the two handle parts 19, 20 which are connected by the joint or connection 14.

Handle 12, and its parts 19, 20, may be of any diameter and length, but the invention will probably be found to be most useful in connection with apparatus comparable in size with such things as broom and mop handles, tent stakes, and like members or devices of one or two inches in diameter, or less. Such items are frequently cumbersome to carry or store because of their length, and it is advantageous that they be capable of disassembly. Obviously, either one or many joints or connections 14 may be used in any device with which the invention might prove useful.

The joint or connection 14 which joins the parts 19, 20 of handle 12, or other elongate cylindrical construction, includes (Figures 2, 3) a tubular sleeve 22, which is usually formed of metal. Sleeve 22 is preferably of one-piece unjointed form, having no longitudinal or lateral gaps or breaks, but sleeve 22 may have seams or joints formed during its fabrication. Sleeve 22 is generally circular in cross-section.

End 20 of one part of handle 12, or other shaftlike member, is reduced in diameter to form a reduced end portion 24 to receive one end of the sleeve 22. End 19 of the other part of handle 12, or other shaft-like member, is similarly reduced in diameter to form a reduced end portion 25 to receive the other end of sleeve 22. Reduced end portions 24, 25 are of a depth corresponding with the thickness of sleeve 22 so that the exterior of sleeve 22 is flush with the exterior of handle 12.

End 19 is secured to sleeve 22 by crimping sleeve 22 at 26, 27, these crimps usually being formed by stamping or pressing opposite sides of the sleeve radially inwardly thereof. The crimps 26, 27 are preferably elongate and parallel to the axis of the sleeve and handle, and the crimps are preferably smoothly rounded as shown. Forming of the crimps causes inward depressions 26a, 27a of the handle material at the respective crimps so that the sleeve is partially imbedded in the handle material and in order to pull the sleeve from reduced end portion 25, it would be necessary to exert sufficient pull on the sleeve and handle in opposite longitudinal directions to break away the handle material at the ends of the crimps. Thus, sleeve 22 is very firmly secured to handle end 19 and is not prone to loosening during use. Crimps 26, 27 are spaced from the end of the handle part to provide a sufficient amount of handle material beyond the ends of the crimps to provide this strength. Any number of crimps may be used as desired. These crimps positively prevent twisting of the handle end within the sleeve. The end 29 of the sleeve is flush against the shoulder 30 forming the end of reduced end portion 25, when the reduced end portion is provided. Formation of the crimps tightens the sleeve about the handle in the vicinity of the crimps so that the sleeve is snugly disposed about the handle, and this results in additional strength of assembly.

The reduced end portion 24 of the other end part 20 of handle 12 is threaded over part of its length. The thread 31 extends from the end of part 20 to a point 32 which is spaced longitudinally from the end of reduced end portion 24 formed by shoulder 33, this shoulder being analogous to shoulder 30 of part 19. End 34 of sleeve 22 is adapted to abut flush against shoulder 33.

Sleeve 22 has threads 36 formed therearound over only a portion of its length having handle part 20 disposed therewithin. Threads 36 terminate, in one direction, at a point spaced from shoulder 33. This point of upward termination of threads 36 is above wood thread end 32 and corresponds with depression 32a caused by overriding of the thread 36 beyond wood thread end 32. In the other direction, toward the end of handle part 20 within the sleeve, threads 36 terminate at a point 36a which is spaced from the handle part end and from the corresponding end of threads 31. Overriding of thread 36 beyond wood thread end 32 provides additional strength and tends to lock the union of threads 31, 36 when handle part 20 is screwed into the sleeve to abut sleeve end 34 against shoulder 33. Termination of threads 36 short of the lower end of threads 31 and the lower end of handle part 20 provides that sleeve 22 is not weakened by the thread formation at point 22a where the handle parts abut within the sleeve, point 22a being a natural failure point of sleeve 22 if the natural strength of the round tubular form of sleeve 22 is destroyed by a thread formation rolled at this area of the sleeve.

Therefore, sleeve 22 is of its strongest form, i.e. smooth cylindrical form without distortion, at its areas where failures caused by bending and shock are most likely to occur, namely, at its end above threads 36, at its center where the handle part ends abut, and at its end below crimps 26, 27. Threads 31, 36 will sometimes fit loosely, especially after the wood threads have become worn after a number of disconnections and reconnections of the joint, but the joint will nonetheless be rigid because of the abutment of sleeve end 34 at shoulder 33, and because of the smooth fit of the upper end of the sleeve on the handle, and because of the uninterrupted tubular form and fit of the sleeve where the handle part ends abut. There are nonthreaded sleeve parts to both ends of the threads so that no pivoting about the threaded connection will occur.

Also contributing to the rigidity or stiffness of the joint is the provision that the ends of the handle parts 19, 20 within the sleeve abut firmly one against the other when the joint is made up. Sleeve 22 is of the same length as the combined lengths of recesses 24, 25 so that handle part 20 may be screwed into the sleeve until its end firmly meets the end of handle part 19 within the sleeve. Thus joint 14, when in its preferred form and properly made up, has sleeve 22 in longitudinal tension adjacent the handle ends forced together therewithin, and has the sleeve ends in longitudinal compression because of their abutments against shoulders 30 and 33. The compressibility of the wood of handle 12 assists in creating this condition of the joint.

Other suitable materials, as will be known in the art, may be substituted for the wood of handle 12 and for the metal of sleeve 22.

While a preferred embodiment of the invention has been shown and described by way of illustrating the invention, many modifications thereof may be made by a person skilled in the art without departing from the spirit of the invention, and it is intended to protect by Letters Patent all forms of the invention falling within the scope of the following claims.

I claim:

1. A device for end-to-end connection of axially aligned cylindrical elements of substantially the same diameter, comprising a generally cylindrical tubular sleeve having a threaded portion at one end, a crimped portion at the other end, and a smooth-walled portion therebetween, a first cylindrical element having one end thereof disposed within said smooth-walled sleeve portion and extending through said crimped sleeve portion and held against withdrawal thereby, a second cylindrical element having a threaded end portion screwed into said threaded sleeve portion and therepast to abut firmly against said one end of said first cylindrical element at a point axially spaced from said threaded portion to cause longitudinal bias of said second element at engagement thereof with the threads of said threaded portion to prevent movement of both said elements away from axial alignment therebetween within said smooth-walled sleeve portion.

2. The combination of claim 1, said second cylindrical element threaded end portion fitting said threaded sleeve portion threads loosely, said sleeve having a second smooth-walled portion at the end of said threaded portion opposite said first-named smooth-walled portion to prevent bending movement of said second cylindrical element adjacent said threaded portion end to cause sleeve failure at the end of said threaded portion thereof.

3. The combination of claim 2, said second cylindrical element threaded end portion terminating short of the corresponding end of said sleeve threaded portion at the ends of said threaded portions opposite said first-named smooth-walled sleeve portion to provide thread binding when said second cylindrical element is screwed against the end of said first cylindrical element, said first and second cylindrical elements each including an outwardly projecting shoulder abutting an end of said sleeve.

References Cited in the file of this patent

UNITED STATES PATENTS

| | | |
|---|---|---|
| 285,493 | Langdon | Sept. 25, 1883 |
| 291,819 | Turrell | Jan. 8, 1884 |
| 457,579 | Faber | Aug. 11, 1891 |
| 468,530 | Beardsley | Feb. 9, 1892 |
| 1,291,388 | Bright et al. | Jan. 14, 1919 |
| 1,329,479 | Gavon | Feb. 3, 1920 |
| 2,596,885 | Booth | May 13, 1952 |

FOREIGN PATENTS

| | | |
|---|---|---|
| 838,136 | Germany | May 5, 1952 |